(12) United States Patent
Nakazawa et al.

(10) Patent No.: US 6,370,308 B1
(45) Date of Patent: Apr. 9, 2002

(54) ACOUSTO-OPTICAL DEVICE

(75) Inventors: Tadao Nakazawa; Minoru Seino; Shinji Taniguchi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/106,260

(22) Filed: Jun. 29, 1998

(30) Foreign Application Priority Data

Jul. 2, 1997 (JP) ............................................. 9-176638

(51) Int. Cl.[7] ............................. G02B 6/12; G02F 1/335
(52) U.S. Cl. ............................. 385/132; 385/7; 385/40
(58) Field of Search ............................. 385/9–11, 41, 385/129, 130, 132

(56) References Cited

U.S. PATENT DOCUMENTS 5,185,830 A * 2/1993 Nishimoto .................... 385/11
5,479,552 A * 12/1995 Kitamura et al. ............ 385/132
5,617,493 A * 4/1997 Nishimoto .................... 385/40

FOREIGN PATENT DOCUMENTS

JP              4-51114             2/1992

OTHER PUBLICATIONS

English Abstract of Japanese Application Serial No. 4–51114.

* cited by examiner

*Primary Examiner*—Thong Nguyen
(74) *Attorney, Agent, or Firm*—Staas & Halsey LLP (57) ABSTRACT

An acousto-optical device includes a light waveguide path formed on an acousto-optical substrate, a transducer which crosses the light waveguide path and propagates a surface acoustic wave along the light waveguide path, and a buffer layer provided so that finger electrodes of the transducer are spaced apart from the light waveguide path in crossing portions in which the finger electrodes cross the light waveguide path. The finger electrodes have other portions which directly contact the substrate.

22 Claims, 6 Drawing Sheets

ACOUSTO-OPTICAL DEVICE

BACKGROUND OF THE INVENTION

1. Field of the Invention

The present invention generally relates to acousto-optical devices, and more particularly to an acousto-optical device having a light waveguide path formed on an acousto-optical substrate and a transducer which crosses the acousto-optical waveguide path and propagates a surface acoustic device along the acousto-optical waveguide path, in which various mutual actions are caused in a light wave propagated through the light waveguide path under a surface acoustic wave controllable by an electric signal applied to the transducer.

An optical filter device is used in terminal equipment or a repeater or relay device in an optical communication system in order to separate signal lights which are transmitted in a wavelength-multiplexed formation. The mutual action of a surface-acoustic wave and light can realize a tunable wavelength filter, and the optical system can flexibly be constructed.

Examples of typical filter structures utilizing the surface-acoustic wave are as follows. A structure uses a TE-TM mode transducer which transduces a TE/TM wave of a wavelength input light to a TM/TE wave in combination with a polarizer which extracts a particular polarized wave. Another structure uses the Bragg diffraction. Yet another structure uses a coupling of the even and odd modes in a directional coupler. The above structures can realize a light-intensity modulator and an optical switch in such a way that the structures do not function as a filter.

2. Description of the Related Art

Figure 1A:
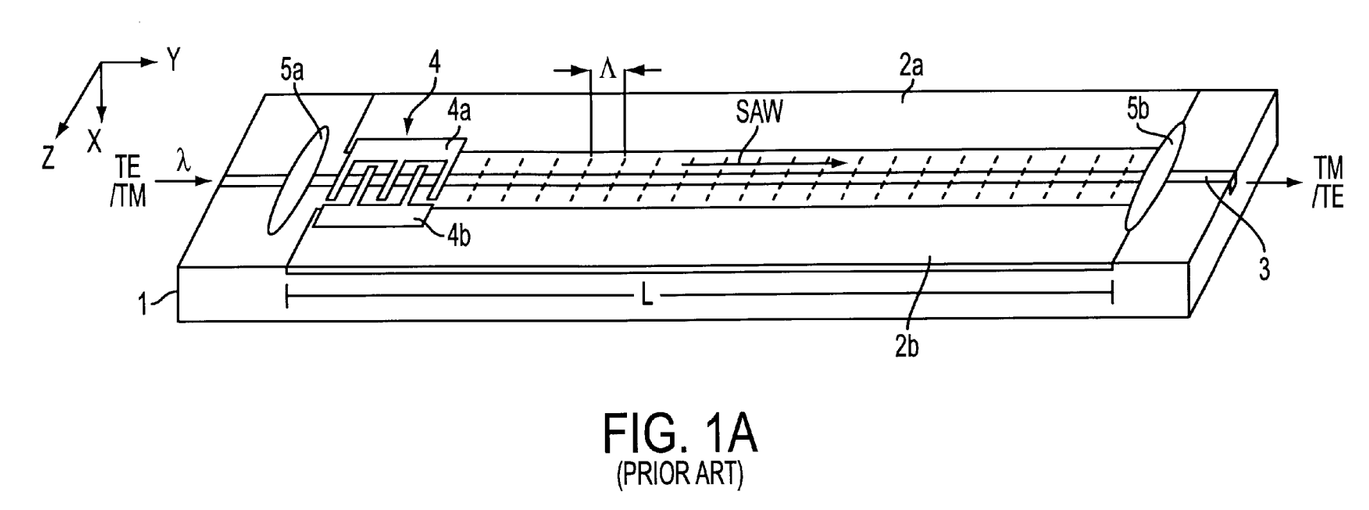
FIG. 1A is a perspective view of a conventional acousto-optical device.

FIG. 1A is a perspective view of a conventional TE-TM mode transducer. As shown in FIG. 1A, the transducer is made up of an acousto-optical substrate 1, high-density Ti diffused areas 2a and 2b, a diffused light waveguide path (channel) 3, an interdigital transducer 4, and acoustic-wave absorbers 5a and 5b. The acousto-optical substrate 1 is made of, for example, an X-cut plate (Y-axis propagation) of $LiNbO_3$. The transducer 4 excites a surface acoustic wave (SAW) in an area including the waveguide path 3, and has finger electrodes 4a and 4b formed of a metal such as aluminum. The absorbers 5a and 5b are made of an acoustically soft material such as wax or rubber.

The high-density Ti diffused areas 2a and 2b are located on both sides of the substrate 1 and function to increase the acoustic velocity therein. Hence, SAW power is contained within the surface area of the substrate 1 sandwiched between the areas 2a and 2b.

The Ti waveguide path 3 provided in the longitudinal direction of the substrate 1 and located in the center thereof is formed by thermally diffusing Ti. The thermal diffusion method can change the refractive indexes $n_o$ and $n_e$ of the $LiNbO_3$ substrate with respect to ordinary light (ray) and extraordinary light by an almost identical degree.

The SAW is generated by utilizing the piezoelectricity of $LiNbO_3$ in such a way that an RF (high frequency) signal is applied across the finger electrodes 4a and 4b of the transducer 4 which is directly mounted on an end surface portion (light input side) of the substrate 1. The distance 1 between the finger electrodes 4a and 4b and the wavelength $\Lambda$ of the SAW has a relationship such that $1 = \Lambda/2$. In this case, the SAW power generated in the substrate 1 is defined by multiplying the RF signal input power by an efficiency. The SAW oriented to the light input side is acoustically absorbed by the absorber 5a and thus disappears immediately. The SAW directed to the light output side is propagated on the substrate portion between the areas 2a and 2b at an acoustic velocity v.

In a case where a polarized wave of TE-mode (or TM-mode) light is applied to the input end of the waveguide path 3 in the above state, the plane of polarization of the polarized wave is turned by 90° due to the acoustic-optical effect of the SAW propagated on the substrate 1 when the wave has traveled a given action length L. Hence, the polarized wave of TE-mode (or TM-mode) light is transduced into that of TM-mode (or TE-mode) light. The above rotation can be controlled by the power of the SAW. The absorber 5b is located in the above position. Hence, the mutual action to the SAW does not occur in the waveguide path 3, and thus the polarized wave of the TM (or TE) mode can be obtained via the output end of the waveguide path 3.

The following phase matching condition is satisfied in the above case:

$$|\beta_{TE} - \beta_{TM}| = (2\pi/\lambda)|N_{TE} - N_{TM}| \quad (1)$$

$$= 2\pi/\Lambda = 2\pi f / v$$

where $\beta_{TE}$ and $\beta_{TM}$ respectively denote the propagation constants of the waveguide modes TE and TM, $N_{TE}$ and $N_{TM}$ respectively denote the effective refractive indexes of the modes TE and TM, $\Lambda$ denotes the wavelength of the SAW, f denotes the frequency, and v denotes the phase velocity. The mode transduction is caused due to the SAW of the frequency f which satisfies equation (1), and the transduction efficiency can be controlled by the SAW power.

The following equation (2) can be obtained from equation (1):

$$\lambda = \Lambda |N_{TE} - N_{TM}| \quad (2)$$

A numerical example will be described below. The index of double refraction $|N_{TE} - N_{TM}|$ obtained used when $LiNbO_3$ is approximately equal to 0.072. In order to realize the above mode transduction with light having a wavelength $\lambda$ of 1.55 nm (frequently used in optical communications), the wavelength $\Lambda$ of the SAW is equal to 21.5 $\mu$m. Since the acoustic velocity (phase velocity) v on the substrate 1 is approximately equal to 3700 m/s, the RF signal is required to have a frequency $f (= v/\Lambda)$ of 172 MHz. The power of the RF input signal depends on the mutual action length L to the SAW. Assuming that L=30 mm, the RF power is approximately equal to 10 mW.

With the above arrangement, the TE/TM wave of the input light can efficiently be transduced into the TM/TE wave by a reduced RF signal level and reduced RF power.

A wideband acousto-optical tunable wave filter can be configured by providing, at the following state, a polarizer for extracting the TM (or TE) wave.

In the structure shown in FIG. 1A, the finger electrodes 4a and 4b of the transducer 4 are directly mounted on the surface of the waveguide path 3. Hence, the light propagated through the waveguide path 3 is absorbed by the finger electrodes 4a and 4b due to the presence of the metal forming them, and thus the light has a considerable propagation loss. This is because metal has a negative dielectric constant and serves as a dielectric having a large loss due to the inertia effect of charges in metal in the light wavelength range. Particularly, the electromagnetic field distribution in the TM mode enters deeply in metal, and is greatly affected by metal (the degree of influence in the TM mode is approximately ten times that in the TE mode).

Figure 1B:
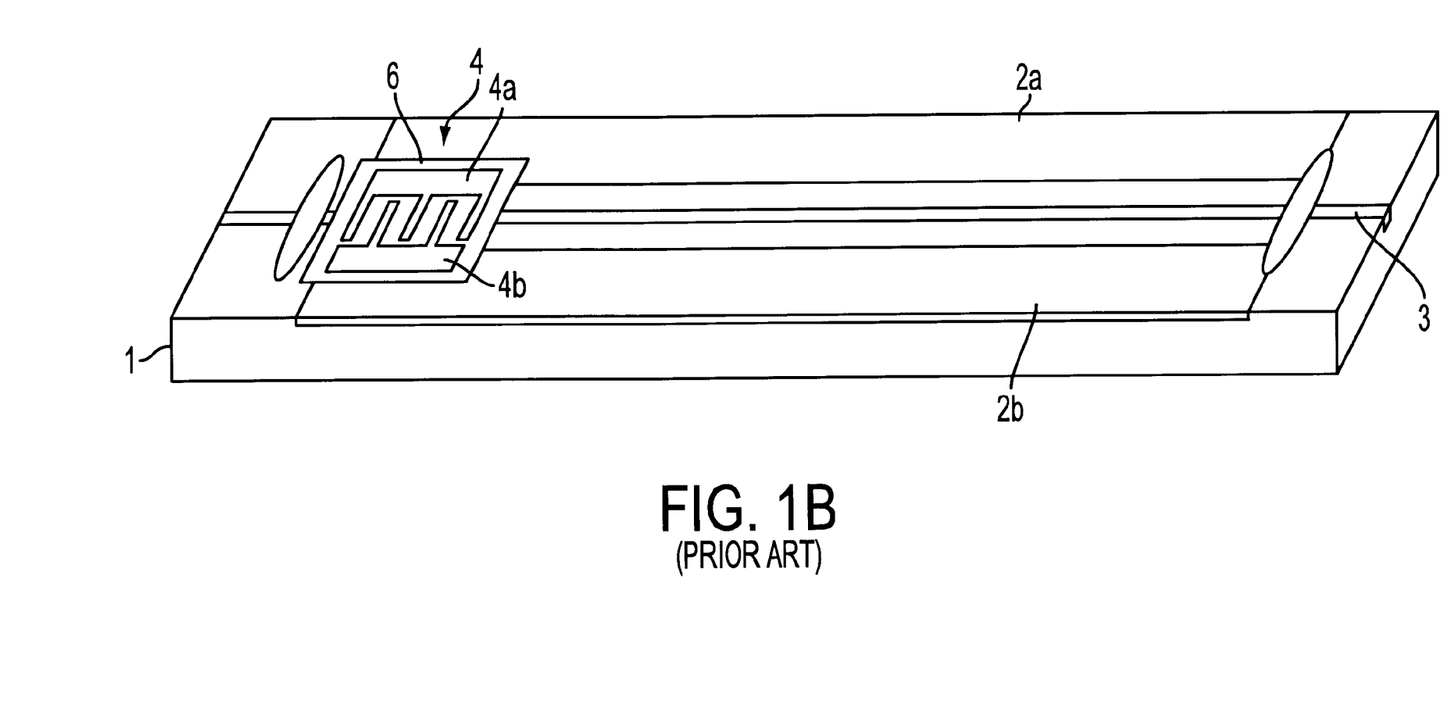
FIG. 1B is a perspective view of a conventional improvement in the acousto-optical device shown in FIG. 1A.

In order to reduce the propagation loss of light caused by the transducer 4, an improved arrangement has been proposed as shown in FIG. 1B. A buffer layer 6 is provided between the entire area between the transducer 4 and the substrate 1 and is formed of a dielectric film such as $SiO_2$. The buffer layer 6 reduces the influence resulting from the presence of metal (transducer 4). As the thickness of the buffer layer 6 is increased, the propagation loss of the light propagated through the waveguide path 3 is drastically reduced. In a case where the $TM_o$ mode light can be propagated through a single-mode waveguide path, if the $SiO_2$ film is 0.16 μm or more in thickness, the propagation loss can be reduced to 0.1 dB or less.

However, the structure shown in FIG. 1B has a disadvantage in that the presence of the buffer layer 6 provided continuously between the transducer 4 and the substrate 1 greatly reduces the efficiency in excitation of the SAW, and an increased RF power is needed. This is because a sufficient intensity of electric field cannot be applied to the substrate 1 due to the electrically insulating performance of the buffer layer 6 and mechanical stress of the buffer layer 6 functions to prevent occurrence of the SAW and propagation thereof.

SUMMARY OF THE INVENTION

It is a general object of the present invention to provide an acousto-optical device in which the above disadvantages are eliminated.

A more specific object of the present invention is to provide an acousto-optical device having a reduced light absorption loss and an increased efficiency in exciting the SAW.

The above objects of the present invention are achieved by an acousto-optical device comprising: a light waveguide path formed on an acousto-optical substrate; a transducer which crosses the light waveguide path and propagates a surface acoustic wave along the light waveguide path; and a buffer layer provided so that finger electrodes of the transducer are spaced apart from the light waveguide path in crossing portions in which the finger electrodes cross the light waveguide path. The finger electrodes have other portions which directly contact the substrate. The acousto-optical structure of the above transducer can generate various mutual actions in light propagated through the light waveguide path. Examples of these mutual actions are colinear coupling with two waves propagated in parallel (the same direction coupling, reverse direction coupling), a mode transduction in which an output wave having a mode different from that of an input wave, TE-TE mode coupling, TM-TM mode transduction, TE-TM mode coupling, and TM-TE mode transduction.

According to the above acousto-optical structure, the portions of the finger electrodes which cross the light waveguide path are spaced apart from the light waveguide path via the buffer layer. Hence, a light absorption loss caused by an influence of a metallic material forming the finger electrodes can be greatly suppressed. The remaining portions of the finger electrodes directly contact the acousto-optical substrate. Hence, the input power of the transducer can efficiently be transduced into SAW power on the acousto-optical substrate. Hence, it is possible to realize an acousto-optical device of low loss and high driving efficiency and thus provide various mode transducers and tunable optical wave filters.

The above acoustic-optical device may be configured so that the buffer layer has a band shape which is continuously provided to the crossing portions. The buffer layer having a band shape is simple and is thus produced easily. It is not required to arrange the buffer layer and the finger electrodes with a high accuracy. Further, it is enough for the buffer layer to have a width slightly greater than the width of the light waveguide path. Hence, the device has a small mechanical stress to generation and propagation of SAW power on the surface of the substrate.

The above acousto-optical device may be configured so that the buffer layer has portions separately provided to areas respectively including the respective crossing portions. Hence, a further reduced mechanical stress to the generation and propagation of the SAW power can be obtained. This contributes to reducing the mechanical fatigue of the portions of the buffer layer.

The acousto-optical device may be configured so that: the buffer layer has a transparency to an input light applied to the acousto-optical device; and the buffer layer has a refractive index smaller than that of the acousto-optical substrate. Hence, the buffer layer functions as a high quality clad layer with respect to input light. The transparency of the buffer layer does not attenuate exudation light from the light waveguide path.

The acousto-optical device may be configured so that the finger electrodes are provided so that the buffer layer is sandwiched between the finger electrodes, and contact the acousto-optical substrate. Hence, the surface acoustic wave can efficiently be excited on both sides of the substrate between which the buffer layer is provided. Further, the surface acoustic wave becomes a single plane wave (or a wave spread in an arc formation) due to the diffraction effect, which is propagated through the acousto-optical substrate.

The acousto-optical device may be configured so that a length of first portions in which the finger electrodes contact the substrate is equal to or greater than twice another length of second portions in which the finger electrodes contact the buffer layer substrate.

The acousto-optical device may be configured so that the buffer layer is formed of a space.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2A:
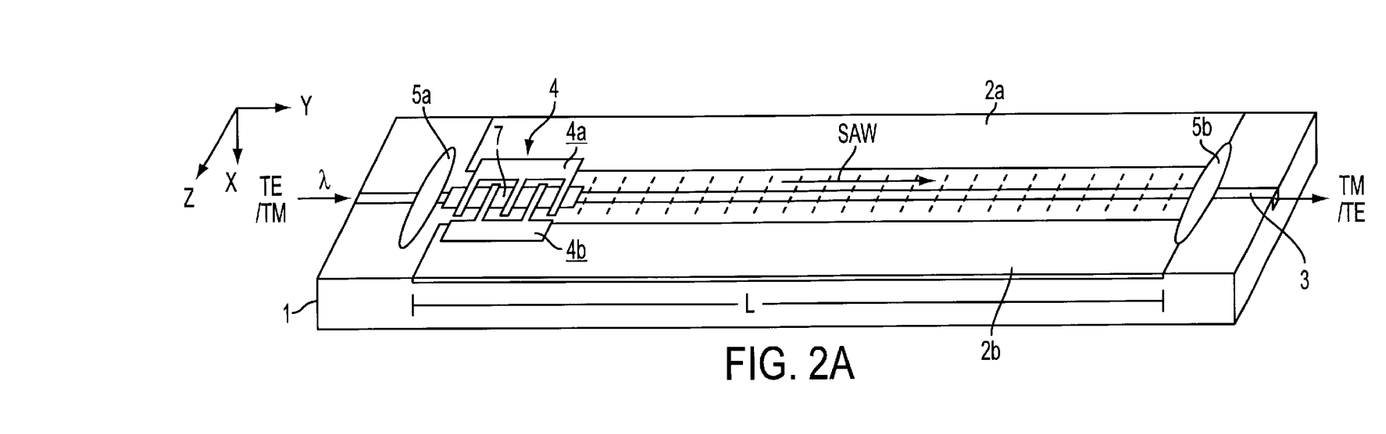
FIG. 2A is a perspective view of an acousto-optical device according to a first embodiment of the present invention.

FIG. 2A is a perspective view of an acousto-optical device according to a first embodiment of the present invention. Identical parts shown in the figures are given the same reference numbers thorough out. The acousto-optical device shown in FIG. 2A functions as a TE-TM mode transducer. A buffer layer 7 of a band shape is continuously formed so as to extend through all crossing portions of the finger electrodes 4a and 4b of the transducer 4 and the light waveguide path 3, sandwiched therebetween. An electric signal is applied across the finger electrodes 4a and 4b, and the SAW generated under the transducer 4 can be controlled by the electric signal.

The acousto-optical substrate 1 is formed of X-cut (Y-axis propagation) plate of $LiNbO_3$. The light waveguide path (channel) 3 is formed by patterning a Ti film which is formed on the surface of the substrate 1 and which has a width of 7 $\mu$m and then subjecting it to a thermal diffusion process. For example, the substrate 1 is 1.5 mm wide, 60 mm long and 1 mm thick.

Each of the high-density Ti diffused areas 2a and 2b have, for example, a width of 200 $\mu$m and a length of 30 mm (which corresponds to an interference length L with the SAW equal to 30 mm). The Ti diffused areas 2a and 2b, which function to contain the SAW power in the substrate 1, sandwich the light waveguide path 3. The Ti diffused areas 2a and 2b are spaced apart from each other by, for example, 140 $\mu$m in order to enable a single-mode propagation of the SAW. The thermal diffusion can be performed, for example, at 1050° C. for 30 hours when the Ti film is 1500 Å. The depth of the thermal diffusion obtained under the above condition is approximately equal to the wavelength $\Lambda$ of the SAW, on which most of the SAW power concentrates.

In practice, the thermal diffusion process for the Ti diffused areas 2a and 2b, which will need a comparatively long time, is carried out first, and the thermal diffusion process for the light waveguide path 3 is carried out second.

The absorbers 5a and 5b formed of, for example, resist, are provided on the substrate 1 and located at both the ends of the Ti diffused areas 2a and 2b in order to absorb the SAW. The transducer 4 is provided in the vicinity of the absorber 5a.

Figures 2B, 2C:
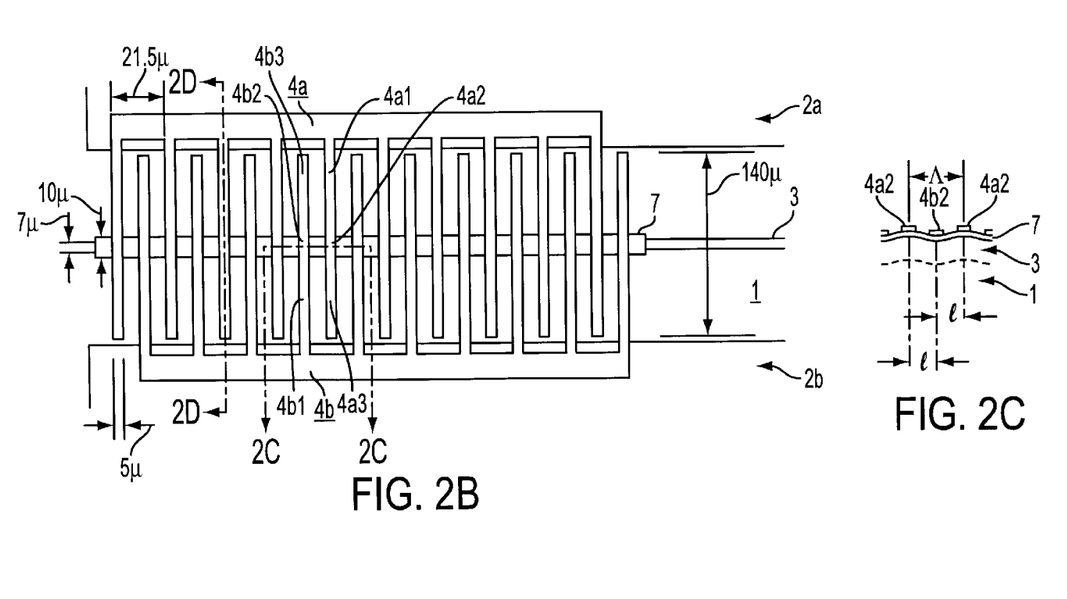
FIG. 2B is an enlarged plan view of a transducer shown in FIG. 2A.
FIG. 2C is a cross-sectional view taken along line c—c shown in FIG. 2B.

FIG. 2B is an enlarged plan view of the transducer 4 and its peripheral components shown in FIG. 2A.

The buffer layer 7 can be formed as follows. An $SiO_2$ film, which is, for example, 0.5 $\mu$m thick, is formed on the substrate 1. Then, the $SiO_2$ film is patterned into a rectangular shape having a width of 10 $\mu$m and a length of 210 $\mu$m so that the patterned film covers the light waveguide path 3 having a width of 7 $\mu$m. The $SiO_2$ has a refractive index of approximately 1.44, which is smaller than that of the Ti diffused light waveguide path 3 (and that of the $LiNbO_3$ substrate 1). Further, the $SiO_2$ film has a sufficient transparency with respect to a wavelength $\lambda$ of 1.55 nm, which is frequently used in optical communications. The process of forming the $SiO_2$ films has been established and the $SiO_2$ film thus obtained has stable performance. Hence, the buffer layer 7 functions as an upper clad layer having a good quality with respect to the light waveguide path 3.

The buffer layer 7 can be formed by a dielectric material other than $SiO_2$ if the dielectric material does not absorb light and has a refractive index smaller than that of the substrate 1.

The transducer 4 is formed by evaporating a metallic layer (Al, Au or the like) to a thickness of, for example, 0.1 $\mu$m on the buffer layer 7 and the substrate 1 and patterning the metallic layer into a shape of the fingers 4a and 4b which have, for example, a width of 5 $\mu$m and a patch of 21.5 $\mu$m. The finger numeral N of the above example is equal to 10. As the finger numeral N increases, the Q of the SAW is increased. When the aperture length of the transducer 4 (which corresponds to the distance between ends of the finger electrodes 4a and 4b) is equal to 140 $\mu$m, which is approximately equal to the width between the Ti diffused areas 2a and 2b, the straight propagating performance (plane wave performance) of the SAW can be ensured.

FIG. 2C is a cross-sectional view taken along line 2c—2c shown in FIG. 2B, in which the cross-section of the transducer 4 is schematically illustrated.

The finger electrodes 4a and 4b of the transducer 4 directly contact the substrate 1 other than the respective crossing portions 4a2 and 4b2 thereof in which the finger electrodes 4a and 4b cross the waveguide path 3. In other words, the buffer layer 7 is provided so that the finger electrodes 4a and 4b of the transducer 4 are spaced apart from the light waveguide path 3 in the central crossing portions 4a2 and 4b2 in which the finger electrodes 4a and 4b cross the light waveguide path 3. The finger electrodes 4a and 4b have other portions 4a1 and 4a3, and 4b1 and 4b3 respectively, integral with extending in opposite directions from the central portions 4a2 and 4b2, respectively which directly contact the substrate 1. Hence, the SAW can efficiently be generated on the surface of the substrate 1 (the waveguide path 3 in its turn). The width of the buffer layer 7 is sufficient to be slightly greater than the width of the waveguide path 3. Hence, there is a small mechanical stress to the generation and propagation of the SAW power on the surface of the substrate 1. The light can efficiently be propagated between the upper and lower high-quality clad layers along the waveguide path 3 without propagation loss. The upper clad layer is the buffer layer 7 and the lower clad layer is the substrate 1.

The operation on the TE-TM mode transduction and the phase matching condition in the above operation may be the same as those which have been described with reference to FIGS. 1A and 1B. The experiments conducted by the inventors show that an RF power of 10 mW can be applied to the transducer 4 of the first embodiment of the present invention, and a light propagation loss of the buffer layer 7 equal to or less than 0.1 dB can be obtained.

A wideband acousto-optical tunable wave filter can be configured by providing, at the following state of the transducer shown in FIG. 2A, a polarizer for extracting the TM (or TE) wave.

Figure 2D:
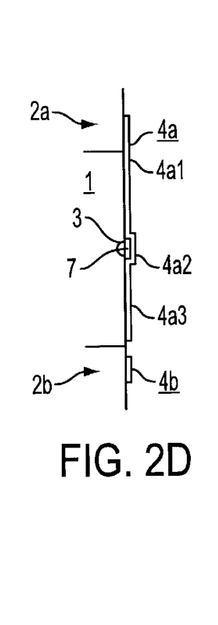
FIG. 2D is a cross-sectional view taken along line d—d shown in FIG. 2B.

FIG. 2D is a cross-sectional view taken along line d—d shown in FIG. 2C, in which there are illustrated the waveguide path 3 formed in the acousto-optical substrate 1, the buffer layer 7 formed on the waveguide path 3, and the finger electrode 4a which contacts the substrate 1 and the buffer layer 7. The finger electrode 4a is formed so as to cover the buffer layer in the central position 4a-2 thereof 7, which is thus sandwiched between the finger electrode 4a and the substrate 1. Although not illustrated in FIG. 2D, the finger electrode 4b contacts the substrate 1 and the buffer layer 7 in the same fashion as between layer 4a.

Generally, the surface acoustic wave generated by the transducer having the finger electrodes is a plane wave when the finger electrodes are sufficiently long, and is propagated so that it is spread in an arc formation when the finger electrodes are comparatively short. In either case, the surface acoustic wave is used so that it is coupled to the SAW waveguide path as a mode as shown in FIG. 2(B), or is converged on the waveguide path in plane formation due to the lens effect.

In the above case, if the finger electrodes 4a have portions in which the buffer layer 7 is provided, the surface acoustic wave is hardly generated on the substrate 1 in the above portions. Hence, the wave planes of both the plane wave and the wave spread in the arc formation are disturbed, and thus the surface acoustic wave having a good mode state or a good distribution cannot be propagated through the SAW waveguide path or the light waveguide path 3. The above holds true for the finger electrodes 4b.

The inventors investigated the relationship between the ratio of the length of the portions in which the finger electrodes 4a and 4b contact the buffer layer 7 to the length of the portions in which the finger electrodes 4a and 4b contact the substrate 1 and the condition which enables the surface acoustic wave having a good mode state or a good distribution to be propagated through the SAW waveguide path or the light waveguide path 3. The inventors found that good results can be obtained when the length of the portions of the finger electrodes 4a and 4b which contact the acousto-optical substrate 1 is equal to or greater than twice the length of the portions of the finger electrodes 4a and 4b contact the buffer layer 7. It is considered that the above results obtained through the investigation conducted by the inventors can be obtained by a mechanism in which a distribution of the wave plane can be compensated for by the diffraction effect of the surface acoustic wave. In the first embodiment of the present invention, the ratio of the length of the portions of the finger electrodes 4a and 4b which contact the buffer layer 7 to the length of the portions of the finger electrodes 4a and 4b which contact the substrate 1 is 10 $\mu$m : 140 $\mu$m. This satisfies the above condition. The above ratio is sufficient to provide good results. In this case, better results can be obtained as the portions of the finger electrodes 4a and 4b are located closer to the centers of the finger electrodes 4a and 4b in the longitudinal direction thereof.

Figure 3A:
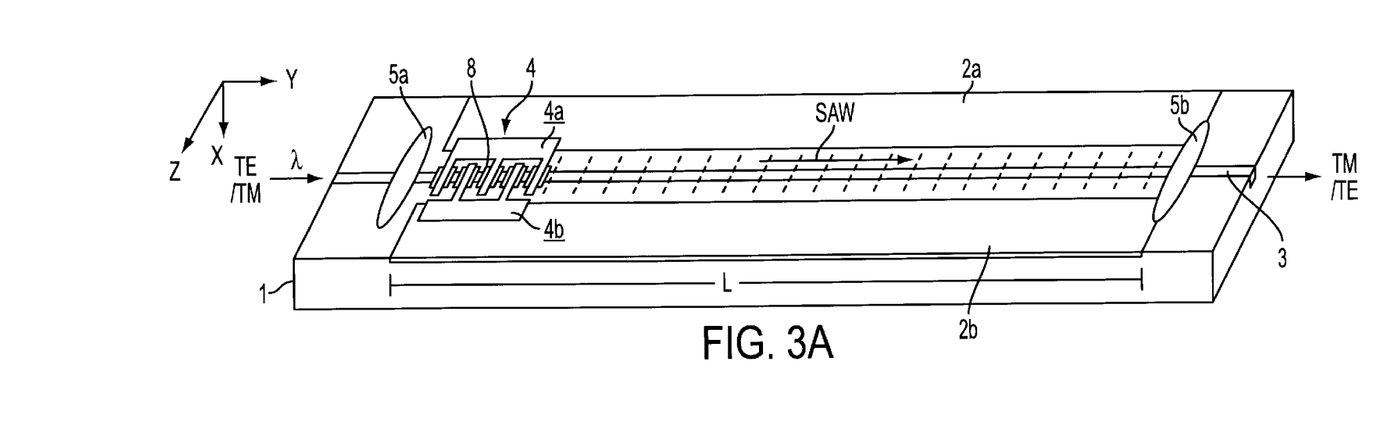
FIG. 3A is a perspective view of an acousto-optical device according to a second embodiment of the present invention.

FIG. 3A shows an acousto-optical device according to a second embodiment of the present invention, which functions as a TE-TM mode transducer. As shown in FIG. 3A, separate, under use, buffer layers 8 are provided at the respective crossing portions in which the central portions 4a2 and 4b2 the finger electrodes 4a and 4b and the light waveguide path 3 cross and are sandwiched therebetween.

Figure 3B:
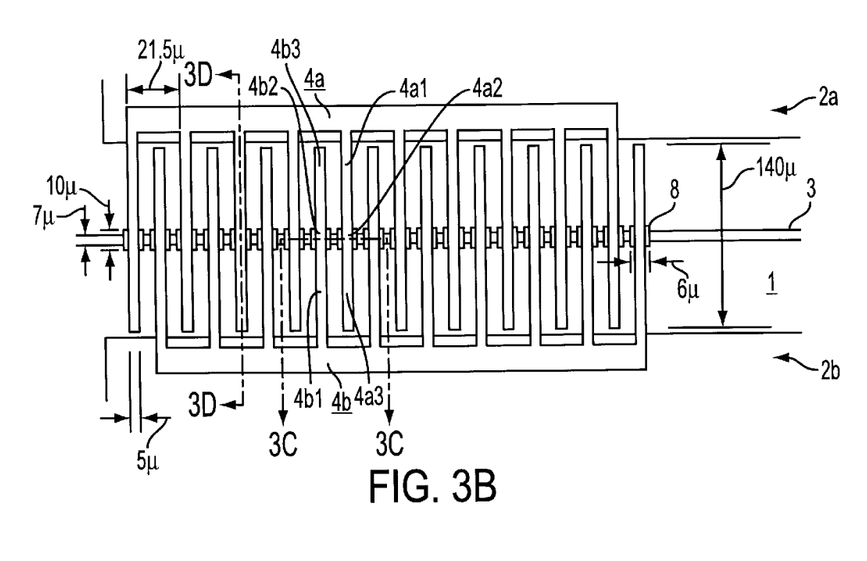
FIG. 3B is an enlarged plan view of a transducer shown in FIG. 3A.

FIG. 3B is an enlarged plan view of the transducer 4 shown in FIG. 3A. The buffer layers 8 can be formed as follows. An SiO$_2$ film having a thickness of, for example, 0.5 $\mu$m is formed on the substrate 1, and is then patterned into blocks having a size sufficient to cover the respective crossing portions (each of which crossing portions has a rectangular area of a size of 7 $\mu$m×5 $\mu$m). Each of the blocks of the buffer layers 8 having a block shape is 10 $\mu$m wide and 6 $\mu$m long.

Figure 3C:
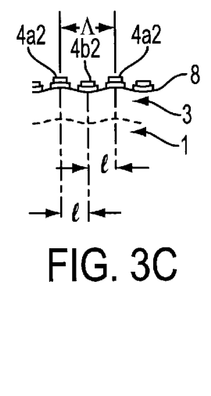
FIG. 3C is a cross-sectional view taken along line c—c shown in FIG. 3B.

FIG. 3C is a cross-sectional view taken along line 3c—3c shown in FIG. 3B. The finger electrodes 4a and 4b of the transducer 4 directly contact the substrate 1 other than the crossing portions of 4a2 and 4b2 of the finger electrodes 4a and 4b, which cross the light waveguide path 3. Hence, the SAW can efficiently be generated on the surface of the substrate (the light waveguide path 3). The buffer layers 8 separately provided to the respective crossing portions have a minimum area. Hence, the mechanical stress to the generation and propagation of the SAW power is extremely small. The light can efficiently be propagated between the upper and lower high-quality clad layers along the waveguide path 3 without propagation loss. The upper clad layers are the buffer layers 8 and the lower clad layer is the substrate 1.

The experiments conducted by the inventors show that an RF power of 10 mW can be applied to the transducer 4 of the second embodiment of the present invention, and a light propagation loss of the buffer layers 8 equal to or less than 0.1 dB can be obtained.

Figure 3D:
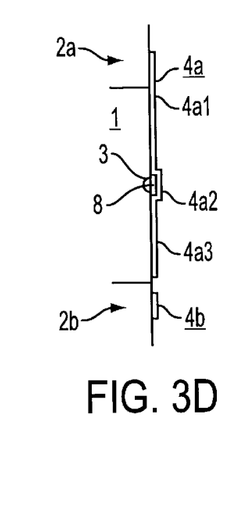
FIG. 3D is a cross-sectional view taken along line d—d shown in FIG. 3B.

FIG. 3D is a cross-sectional view taken along line d—d shown in FIG. 3C, in which there are illustrated the waveguide path 3 formed in the acousto-optical substrate 1, the buffer layers 8 formed on the waveguide path 3, and the finger electrode 4a which contacts the substrate 1 and the buffer layer 7. The finger electrode 4a is formed so as to cover, at the central portion 4a2 thereof the corresponding buffer layer 8, which is thus sandwiched between that central portion 4a2 of the finger electrode 4a and the substrate 1. Although not illustrated in FIG. 3D, each of the finger electrodes 4b contacts the substrate 1 and the respective buffer layer 8 in the same manner as in the finger electrode 4b2.

In the second embodiment of the present invention, the length of the portions of the finger electrodes 4a and 4b contact the acousto-optical substrate 1 is equal to or greater than the length of the portions of the finger electrodes 4a and 4b which contact the buffer layers 8. The above condition is sufficient to provide the good results. In this case, the better results can be obtained as the portions of the finger electrodes 4a and 4b are located closer to the centers of the finger electrodes 4a and 4b in the longitudinal direction thereof.

The first and second embodiments of the present invention are directed to the TE-TM mode transducers. However, the basic structure of the acousto-optical device of the present invention can be used to realize various functional devices.

The first and second embodiments of the present invention are equipped with the SAW waveguide path defined by the Ti diffused areas 2a and 2b. Alternatively it is possible to employ other arrangements which propagate the SAW through the light waveguide path 3. For example, a lens can be used to propagate the SAW through the light waveguide path 3.

Figure 4A:
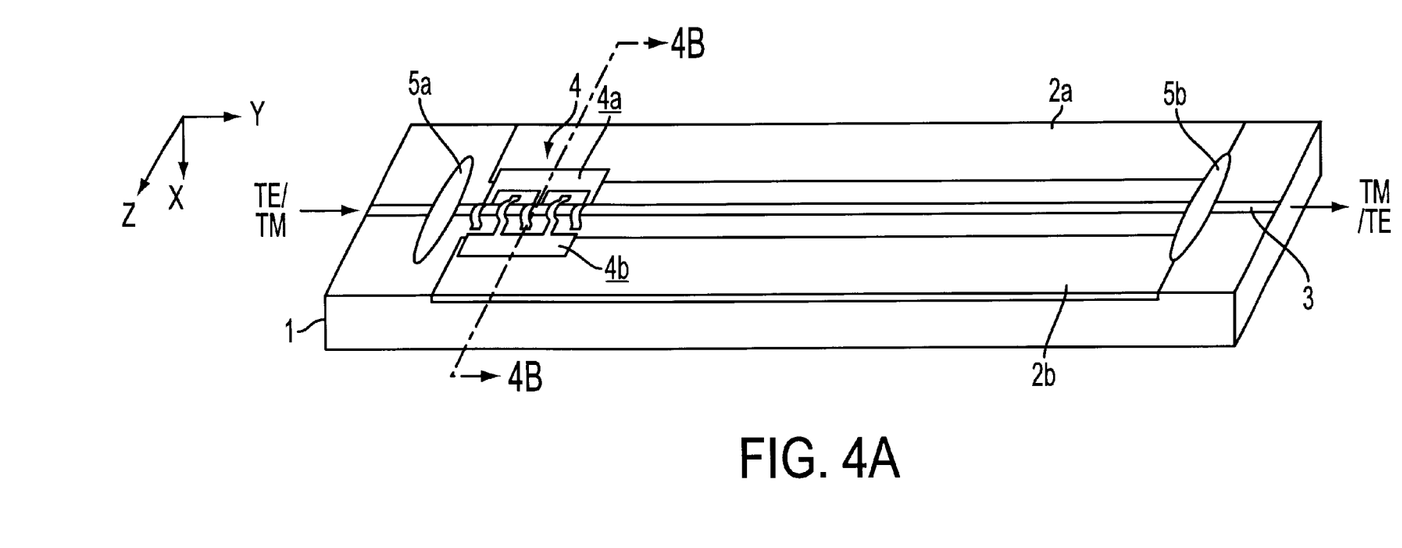
FIG. 4A is a perspective view of an acousto-optical device according to a variation of the first and second embodiments of the present invention.
Figure 4B:
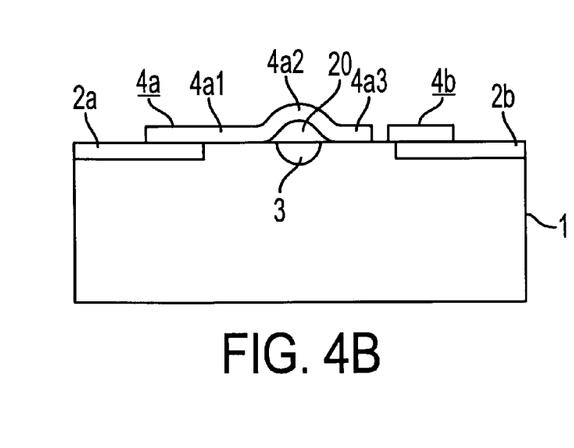
FIG. 4B is a cross-sectional view taken along line d—d shown in FIG. 4A.

FIG. 4A is a perspective view of an acousto-optical device according to a variation of the first and second embodiments of the present invention. FIG. 4B is a cross-sectional view taken along line d—d shown in FIG. 4A. The variation shown in FIGS. 4A and 4B has an arrangement having a buffer layer which is a space defined between the central portions 4a2 and 4b3 of finger electrodes 4a and 4b, respectively and the acousto-optical substrate 1 so that the finger electrodes 4a and 4b do not contact but are spaced apart from the waveguide path 3. In order to define the above arrangement, the finger electrodes 4a and 4b have curved portions 4a2 and 4b2. The buffer layer 20 functions in the same manner as the buffer layer 7 or buffer layers 8. The aforementioned condition can be applied to the variation.

Figure 5:
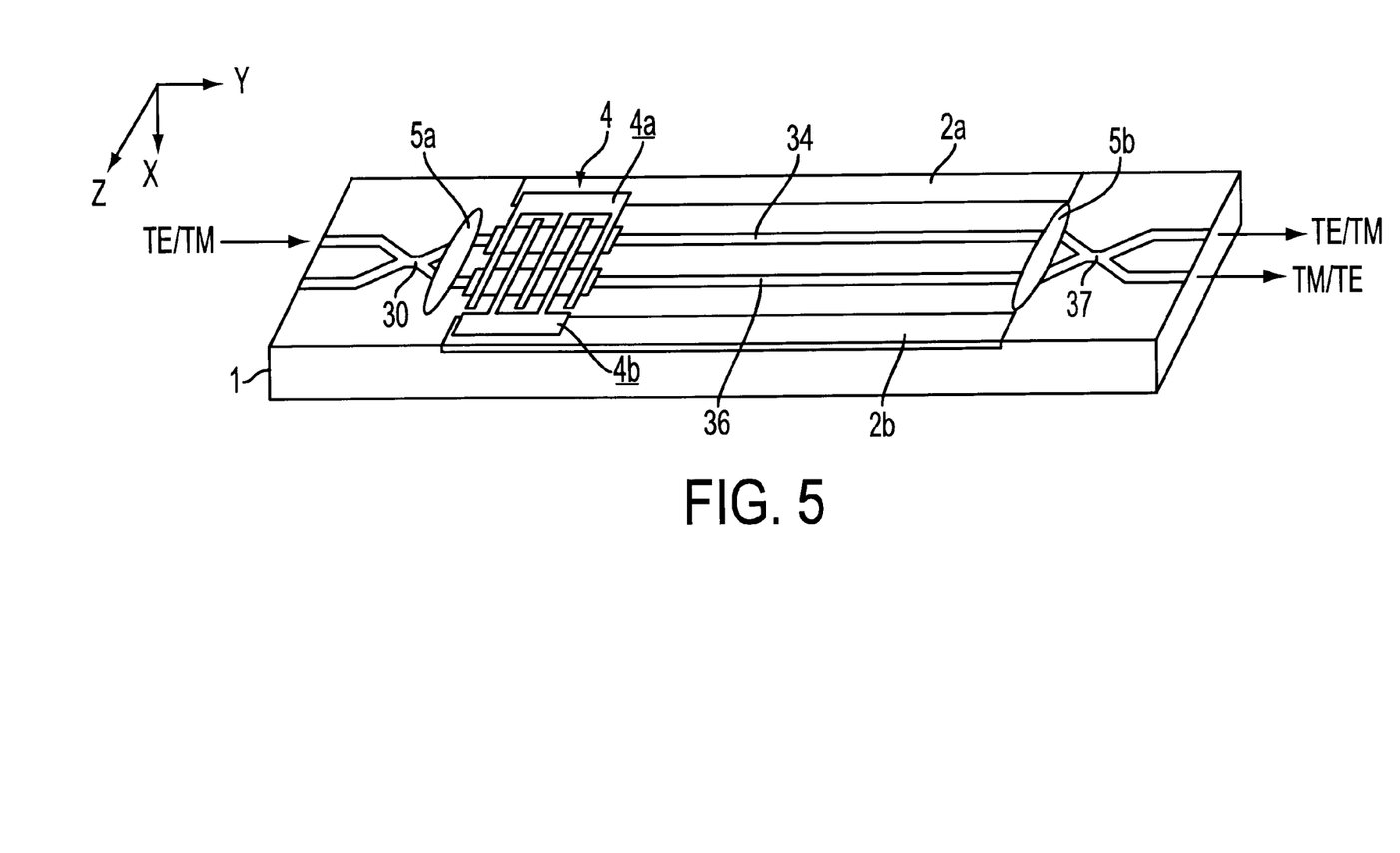
FIG. 5 is a perspective view of an acousto-optical device according to a third embodiment of the present invention.

FIG. 5 is a perspective view of an acousto-optical device according to a third embodiment of the present invention.

Two polarization beam splitters 30 and 32 sandwich two TE-TM mode transducers. The buffer layers of the two TE-TM mode transducers can be formed as in any of the buffer layers 7, 8 and 20. The acousto-optical device functions as a filter independent of the polarization of the incident light. If the finger electrodes 4a and 4b are directly formed on two waveguide paths 34 and 36, the polarization dependent loss with respect to the TE and TM polarizations is extremely great. Hence, a change in the polarized condition of the incident light greatly varies the intensity of the output light. Hence, the above arrangement cannot be used for applications in which a variation in the output light intensity is required to be severely controlled, such as optical communications. In contrast, according to the present invention, the buffer layer or layers are provided between the interdigitized finger electrodes 4a and 4b and the acousto-optical substrate1. Hence, the polarization dependent loss does not occur and the present invention can be suitably used for applications as described above.

The present invention is not limited to the specifically disclosed embodiments, and variations and modifications may be made without departing from the scope of the present invention.

What is claimed is:

1. An optical device, comprising:
   an acousto-optical substrate on which a light waveguide is formed;
   a buffer layer covering the light waveguide; and
   a finger electrode, said buffer layer sandwiched between finger portions of the finger electrode and the acousto-optical substrate, the finger electrode comprising a base portion and the finger portions extending from the base portion and crossing the light waveguide, the finger portions having first portions on the buffer layer and second portions directly contacting a surface of the acousto-optical substrate, wherein a surface acoustic wave propagates from the finger electrode producing a substantially plane wave.

2. The acoustic-optical device as claimed in claim 1, wherein the buffer layer has a continuous band shape, spaced portions of the buffer layer being sandwiched between respective crossing portions of the finger electrodes and the light waveguide path.

3. The acousto-optical device as claimed in claim 1, wherein the buffer layer comprises separate, individual portions disposed at respective areas, each area including a respective crossing portion of the finger electrode.

4. The acousto-optical device as claimed in claim 1, wherein:
   the buffer layer has a transparency to an input light applied to the acousto-optical device; and
   the buffer layer has a refractive index smaller than that of the acousto-optical substrate.

5. The acousto-optical device as claimed in claim 1, wherein a length of each of the finger portions of the finger electrodes, which contact the substrate, is equal to or greater than twice the length of the base portion of the finger electrodes, which contact the buffer layer.

6. The acousto-optical device as claimed in claim 1, the buffer layer comprises a space.

7. The acousto-optical device as claimed in claim 6, wherein the space comprises an air gap.

8. An optical device, comprising:
   a light waveguide path formed on an acousto-optical substrate;
   a transducer having finger electrodes, each of the finger electrodes comprising a base portion and finger portions extending from the base portion and crossing the light waveguide path, the finger portions having first portions on a buffer layer and second portions directly contacting a surface of the acousto-optical substrate, said transducer propagating a surface acoustic wave along spaced-apart portions of the light waveguide path producing a substantially single plane wave in the light waveguide path.

9. The acousto-optical device as claimed in claim 8, wherein the finger electrodes are arranged in parallel, spaced relationship, transverse to the light waveguide path.

10. The acousto-optical device as claimed in claim 8, further comprising the buffer layer disposed between and spacing each central portion of a respective finger electrode from the light waveguide path.

11. The acousto-optical device as claimed in claim 10, wherein the buffer layer extends continuously along the light waveguide path, portions thereof being disposed between respective crossing portions of the finger electrodes and the light waveguide path.

12. The acousto-optical device as claimed in claim wherein 10, the buffer layer comprises plural individual buffer layers, each disposed between the crossing portion of respective finger electrode and the light waveguide path.

13. The acousto-optical device as claimed in claim 10, wherein the crossing portions are spaced from the light waveguide path by an air gap.

14. The acousto-optical device as claimed in claim 8, wherein:
   the light waveguide path comprises first and second parallel light waveguide paths formed on the acousto-optical substrate;
   the transducer crosses both of the parallel, first and second parallel light waveguide paths and propagates respective surface acoustic waves along the respective, first and second parallel light waveguide paths; and
   the central portion of each finger electrode comprises spaced, first and second central portions crossing, and spaced from, the first and second light waveguide paths, respectively, and at least one other portion, integrally interconnecting the first and second central portions and directly contacting the substrate.

15. The acousto-optical device as claimed in claims 14, wherein the finger electrodes are arranged in first and second sets of plural first finger electrodes and plural second finger electrodes in an interdigitized relationship.

16. The acousto-optical device as claimed in claim 14, further comprising first and second buffer layers disposed between and spacing the first and second crossing portions, respectively, of each respective finger electrode from the first and second light waveguide paths, respectively.

17. The acousto-optical device as claimed in claim 16, wherein the first and second buffer layers extend continuously along the respective first and second light waveguide paths, corresponding portions thereof being disposed between the respective first and second crossing portions of the finger electrodes and the respective first and second light waveguide paths.

18. The acousto-optical device as claimed in claim 16, wherein the first and second crossing portions of each finger electrode are spaced from the respective first and second light waveguide paths by corresponding first and second air gaps.

19. An acousto-optical device, comprising:
   a transducer having spaced-apart finger electrodes crossing a light waveguide path formed on an acousto-optical substrate; and a buffer layer crossing the light waveguide path under the finger electrodes with portions of the finger electrodes directly contacting the substrate while other portions of the finger electrodes are blocked from contacting the substrate, wherein each of the finger electrodes comprises a base portion and finger portions extending from the base portion and crossing the light waveguide path, the finger portions having first portions on the buffer layer and second portions directly contacting a surface of the acousto-optical substrate, said light waveguide producing a substantially plane wave from an injected surface acoustic wave.

20. An optical device, comprising:

an acousto-optical substrate on which a light waveguide is formed;

a buffer layer covering only a part of the light waveguide;

a plurality of finger electrodes each formed on the buffer layer so as to cross the light waveguide; and a base electrode portion formed along the light waveguide, the plurality of finger electrodes being connected to the base portion, each of the finger electrodes having a part directly contacting a surface of the acousto-optical substrate and a part directly contacting a surface of the buffer layer.

21. An optical device, comprising:

a light waveguide path forming on an acousto-optical substrate;

a buffer layer covering only a part of the light waveguide;

a transducer provided so as to cross the light waveguide path, the transducer exciting a surface acoustic wave such that the surface acoustic wave propagates along the light waveguide path, the transducer comprising a base electrode portion formed along the light waveguide; and a plurality of finger electrodes, each of the finger electrodes formed on the buffer layer so as to cross the light waveguide path and connected to the base electrode portion, and each of the finger electrodes having a portion directly contacting a surface of the acousto-optical substrate and a portion directly contacting a surface of the buffer layer.

22. An acousto-optical device comprising:

a transducer having spaced-apart finger electrodes crossing a light waveguide path formed on an acousto-optical substrate and a base electrode portion extending along the light waveguide path; and a buffer layer positioned at a crossing of the light waveguide path and the finger electrodes, said buffer layer preventing a surface of the substrate from contacting a part of each finger electrode directly, each of the finger electrodes comprising a finger portion formed across the light waveguide path on the buffer layer and connected to a base portion, each of the finger portions having a part directly contacting with the surface of the acousto-optical substrate and a part directly contacting with a surface of the buffer layer; and the base portion of the finger electrodes connected to the base electrode portion.

* * * * *

UNITED STATES PATENT AND TRADEMARK OFFICE
CERTIFICATE OF CORRECTION

PATENT NO.    : 6,370,308 B1
DATED         : April 9, 2002
INVENTOR(S)   : Tadao Nakazawa et al.

It is certified that error appears in the above-identified patent and that said Letters Patent is hereby corrected as shown below:

<u>Column 10,</u>
Line 21, change "wherein 10," to -- 10, wherein --.

Signed and Sealed this

Fourth Day of June, 2002

Attest:

Attesting Officer

JAMES E. ROGAN
*Director of the United States Patent and Trademark Office*